(12) United States Patent
Dokmanic et al.

(10) Patent No.: US 9,759,805 B2
(45) Date of Patent: Sep. 12, 2017

(54) OPTIMAL ACOUSTIC RAKE RECEIVER

(71) Applicant: Ecole Polytechnique Federale de Lausanne (EPFL), Lausanne (CH)

(72) Inventors: Ivan Dokmanic, Lausanne (CH); Robin Scheibler, Lausanne (CH); Martin Vetterli, Grandvaux (CH)

(73) Assignee: Ecole Polytechnique Federale De Lausanne (EPFL) (CH)

( * ) Notice: Subject to any disclaimer, the term of this patent is extended or adjusted under 35 U.S.C. 154(b) by 262 days.

(21) Appl. No.: 14/790,316

(22) Filed: Jul. 2, 2015

(65) Prior Publication Data

US 2016/0018510 A1    Jan. 21, 2016

(30) Foreign Application Priority Data

Jul. 15, 2014   (CH) ...................................... 1073/14

(51) Int. Cl.
| | |
|---|---|
| *G01S 5/18* | (2006.01) |
| *G10K 11/34* | (2006.01) |
| *H04R 3/00* | (2006.01) |
| *H04S 7/00* | (2006.01) |
| *H04B 1/712* | (2011.01) |

(Continued)

(52) U.S. Cl.
CPC ............... *G01S 5/18* (2013.01); *G10K 11/34* (2013.01); *G10L 21/0208* (2013.01); *H04B 1/712* (2013.01); *H04R 3/005* (2013.01); *H04S 7/305* (2013.01); *G10L 2021/02166* (2013.01); *H04R 2203/12* (2013.01)

(58) Field of Classification Search
CPC ....... G01S 5/18; H04R 3/005; H04R 2203/12; H04B 1/712; G10K 11/34; G10L 21/0208; G10L 2021/02166; H04S 7/305
See application file for complete search history.

(56) References Cited

U.S. PATENT DOCUMENTS

2015/0286459 A1*  10/2015  Habets ................. G10K 11/346
                                                              700/94
2016/0018510 A1*   1/2016  Dokmanic ............... G01S 5/18
                                                              367/119

FOREIGN PATENT DOCUMENTS

| CH | EP 2975609 A1 * | 1/2016 | ............... G01S 5/18 |
| EP | 2747451 A1 | 6/2014 | |
| WO | WO-2014096364 A1 | 6/2014 | |

OTHER PUBLICATIONS

I. Dokmanic, et al., "Raking the Cocktail Party", IEEE Journal of Selected Topics in Signal Processing, vol. 9, No. 5, Aug. 2015, pp. 825-836.

(Continued)

*Primary Examiner* — Daniel Pihulic (74) *Attorney, Agent, or Firm* — Blank Rome LLP (57) ABSTRACT

An acoustic processing method for M acoustic receivers comprising the steps of: Determining a beamforming weight vector with M weights for the M acoustic receivers based on at least one the steering vector of at least one real acoustic source, on steering vectors of image sources of the at least one real acoustic source and on a first matrix depending on the covariance matrix of the noise and/or on at least one interfering sound source, wherein each of the image sources corresponds to one path of the acoustic signal between one of the at least one real source and one of the M acoustic receivers with at least one reflection; and linearly combining the M acoustic signals received at the M acoustic receivers on the basis of the M weights of the beamforming vector.

16 Claims, 4 Drawing Sheets

(51) Int. Cl.
*G10L 21/0208* (2013.01)
*G10L 21/0216* (2013.01)

(56) References Cited

OTHER PUBLICATIONS

Annibale, et al., The Scenic Project: Space—Time Audio Processing for Environment-Aware Acoustic Sensing and Rendering, Presented at 131st Convention, Oct. 2011, 10pgs.

Jan, et al., Matched-Filter Processing of Microphone Array for Spatial Volume Selectivity, CAIP Center: Rutgers University, Apr. 30, 1995, 4pgs.

Mark R.P. Thomas, Microphone Array Signal Processing Beyond the Beamformer, Microsoft Research/Imperial Collect of London, http://msrvideo.vo.msecnd.net/rmcvideos/152104/d1/152104.pdf, 2011,pp. 1-62, 76 pages.

Tsimenidis, et al., Adaptive Spread-Spectrum Based RAKE Receiver for Shallow-Water Acoustic Channels, School of Electrical, Electronic and Computer Engineering, 1995, 1-6.

Yu, et al., An Improved Array Steering Vector Estimation Method and Its Application in Speech Enhancement, EURAISP Journal on Applied Signal Processing, 2005, 18:2930-2937.

International Search Report issued in CH10732014 on Oct. 27, 2014, 13 pages.

\* cited by examiner

OPTIMAL ACOUSTIC RAKE RECEIVER

This application claims priority to Swiss Patent Application No. CH01073/14, filed Jul. 15, 2014, which is hereby incorporated by reference.

FIELD OF THE INVENTION

The present invention concerns a processing method and apparatus for acoustic signals, in particular for improving the quality of the received acoustic signal.

DESCRIPTION OF RELATED ART

It is a general objective to identify a specific acoustic signal, e.g. a speech signal, at a receiver. However, in many situations the specific desired acoustic signal is superimposed by noise signals and/or interfering signals so that the quality of the specific desired acoustic signal is deteriorated. In the presence of reflecting objects, for example in rooms, the measured signal is further superimposed by echoes of the specific acoustic signal and of the interfering signals.

In wireless communications, RAKE receivers take advantage of multipath propagation instead of trying to mitigate it. By using multiple antennas and spatial processing such as beamforming, multipath components that would otherwise not be resolvable because they arrive at similar times, become resolvable because they arrive from different directions. The basic idea is to coherently add all the multipath components, and thus increase the effective signal-to-noise ratio (SNR) and the probability of correct symbol detection. However, in wireless communication the time between two distinct echoes arriving at the receiver is typically large compared to the length of a symbol, at least in comparison with the same ratio in room acoustics. In addition, the radio signal is designed so that it is near orthogonal to its time-shifted copies. On the other hand, in room acoustics, typical times between echoes are 5-10 ms, but the archetypal signal of interest is speech. Speech segments are always several orders of magnitude longer than the delay spread of the channel. In addition, speech lacks the orthogonality property. Therefore, the construction of the RAKE receivers for acoustic signals, in particular for speech, in analogy with wireless communications is challenging.

It is known how to perform a delay-and-sum-beamforming for the desired signal and its echoes (this method is called matched filter processing), e.g. in Jan, E.-E., Svaizer, P., & Flanagan, J. L. (1995). "Matched-filter processing of microphone array for spatial volume selectivity". Circuits and Systems, 1995. ISCAS '95, 1995 IEEE International Symposium on, 2, 1460-1463. doi:10.1109/ISCAS.1995.521409. However, those beamformers are suboptimal whenever interferers are present or the noise covariance matrix is not proportional to an identity matrix.

Therefore, it is an object of the present invention to improve the quality of received specific acoustic signals with acoustic rake receivers.

It is another object of the invention to find alternative methods for performing beamforming of acoustic signals.

BRIEF SUMMARY OF THE INVENTION

In one embodiment, this object is solved by an acoustic processing method/apparatus for M acoustic receivers comprising the steps of/being configured for the following steps: First, a beamforming weight vector with M weights for the M acoustic receivers based on at least one the steering vector of at least one real acoustic source, on steering vectors of image sources of the at least one real acoustic source and on a first matrix depending on the covariance matrix of the noise and/or on at least one interfering sound source, wherein each of the image sources corresponds to one path of the acoustic signal between one of the at least one real source and one of the M acoustic receivers with at least one reflection. Second, the M acoustic signals received at the M acoustic receivers are linearly combined on the basis of the M weights of the beamforming vector.

This has the advantage that the beamformer is optimized such that the noise and the interferer influence is minimal and the influence of the desired signal is maximal. Such a formulation could consider the kind of noise and/or the disturbances of an interferer.

In one embodiment, this object is solved by an acoustic processing method/apparatus for M acoustic receivers comprising the steps of/being configured for the following steps: First, a beamforming weight vector with M weights for the M acoustic receivers is determined based on at least one interfering sound source. Second, the M acoustic signals received at the M acoustic receivers are linearly combined on the basis of the M weights of the beamforming vector.

This has the advantage that the beamformer is optimized such that the interferer influence is minimal.

In one embodiment, this object is solved by an acoustic processing method/apparatus comprising the steps of/being configured for the following steps: First beamforming weights for a plurality of acoustic receivers based on a direction, distance and/or relative position of image sources of at least one real source of an acoustic signal, wherein each of the image sources corresponds to one path of the acoustic signal between one of the at least one real source and one of the plurality of acoustic receivers with at least one reflection. Second, the acoustic signals received at the plurality of acoustic receivers are linearly combined on the basis of the beamforming weights.

This has the advantage that the beampattern of the receiver can be arranged such that the power of the acoustic signal is maximal in the direction of the multipath components of the specific acoustic signal corresponding to reflections at reflecting surfaces. Therefore, the quality of the specific acoustic signal received directly is further improved by the reflected signals (echoes, image transmitters, image receivers) in a manner that is optimal, e.g. with respect to noise and interference. This means that the interfering signals and noise are maximally attenuated with respect to the desired signal. This is in particular advantageous where an interfering signal blocks the direct path of the source of the specific acoustic signal. However, also in situations, where there are no interfering signals, this can increase the quality of the signal significantly, e.g. in situations when correlated or non-white noise is present, or when the source of the specific acoustic signal has a transmission distribution pointing away from the receiver (like a talker speaking in the other direction).

All those embodiments can be applied equally in transmission beamforming.

In one embodiment, this object is solved by an acoustic processing method/apparatus comprising the steps of/being configured for the following steps: First, by determining a beamforming weight vector with M weights for the M acoustic transmitters based on at least one steering vector of at least one real acoustic receiver, on steering vectors of image receivers of the at least one real acoustic receiver and on a first matrix depending on the covariance matrix of the noise and/or on at least one other acoustic receiver which is not intended to receive a transmission signal, wherein each of the image receivers corresponds to one path of the transmission signal between one of the M transmitters and one of the at least one real receiver with at least one reflection. Second, by beamforming the transmission signal with the M weights for the M acoustic transmitters In one embodiment, this object is solved by an acoustic processing method/apparatus comprising the steps of/being configured for the following steps: First, beamforming weights for a plurality of acoustic transmitters are determined based on a direction and/or position of image receivers of at least one real receiver, wherein each image receiver corresponds to one path of the acoustic signal between one of the plurality of acoustic transmitters and one of the at least one real receiver with at least one reflection. Second, the acoustic signal is sent from the plurality of acoustic transmitters on the basis of the beamforming weights.

The dependent claims refer to further advantageous embodiments of the invention.

In one embodiment, said first matrix and/or the beamforming weights depend(s) on the position of an interfering source.

In one embodiment, said first matrix depends on the position of the interfering source and on the position of the interfering image sources, wherein each of the interfering image sources corresponds to one path of the interfering signal between one of the at least one interfering source and one of the M acoustic receivers with at least one reflection.

In one embodiment, said first matrix and/or the beamforming weights depend(s) on the sum of the steering vectors of the interfering source and the image interfering sources.

In one embodiment, said first matrix and/or the beamforming weights depend(s) on the sum of the steering vectors of the interfering source and the image interfering sources multiplied with the adjoint of the sum of the steering vectors of the interfering source and the image interfering sources.

In one embodiment, said first matrix comprises a first addend depending on the covariance matrix of the noise and a second addend depending on the position of an interfering source.

In one embodiment, the beamforming weight vector is based on the first matrix and on a second matrix depending on the at least one steering vector of at least one real acoustic source and on the steering vectors of the image sources of the at least one real acoustic source.

In one embodiment, the second matrix comprises the at least one steering vector of the at least one real acoustic source and the steering vectors of the image sources of the at least one real acoustic source as columns or rows.

In one embodiment, the beamforming weight vector is proportional to diagonal elements of the multiplication of the inverse of said first matrix with the second matrix.

In one embodiment, the beamforming weight vector is proportional to the eigenvector of a third matrix corresponding to the largest eigenvalue, wherein the third matrix depends on the first matrix and the second matrix.

In one embodiment, the third matrix depends on inverse of the Cholesky decomposition of the first matrix and on the second matrix.

In one embodiment, the third matrix is proportional to $$(C^{-1})^H A_s A_s^H C^{-1},$$

with C being the Cholesky decomposition of the first matrix and $A_s$ being the second matrix.

In one embodiment, the beamforming weight vector is proportional to the inverse of said first matrix multiplied with the sum of steering vectors of the image sources of at least one real acoustic source.

In one embodiment, each of the image sources is arranged in the direction of the position of a last reflection of the corresponding path of the acoustic signal from the position of one of the plurality of acoustic receivers.

In one embodiment, each of the image sources is arranged at a distance corresponding to the length of the corresponding path.

In one embodiment, the position and/or distance of the image sources is detected by associating echoes received at at least one of the plurality of acoustic receivers to reflecting surfaces.

In one embodiment, the beamforming weights comprise one beamforming weight for each one of the plurality of acoustic receivers which is determined on the basis of at least one image source (or real source) corresponding to at least one path from the at least one real source to the one of the plurality of acoustic receivers.

In one embodiment, beamforming is performed in the frequency domain.

In one embodiment, beamforming is performed in the time domain.

In one embodiment, the image transmitters correspond to paths of early echoes. Early echoes are the echoes arriving within approximately 50 ms after the direct signal, although this time varies with the scenario.

In one embodiment, each of the plurality of receivers is a microphone.

In one embodiment, each of the plurality of transmitters is a loudspeaker.

In one embodiment, each of the at least one real receiver is a microphone.

In one embodiment, each of the at least one transmitter is a loudspeaker.

In one embodiment, each microphone/receiver is omnidirectional and/or has a flat frequency response.

In one embodiment, the echoes are created by reflective surfaces, e.g. a wall of a room.

In one embodiment, the covariance matrix of the noise is not equal and/or proportional to the identity matrix.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
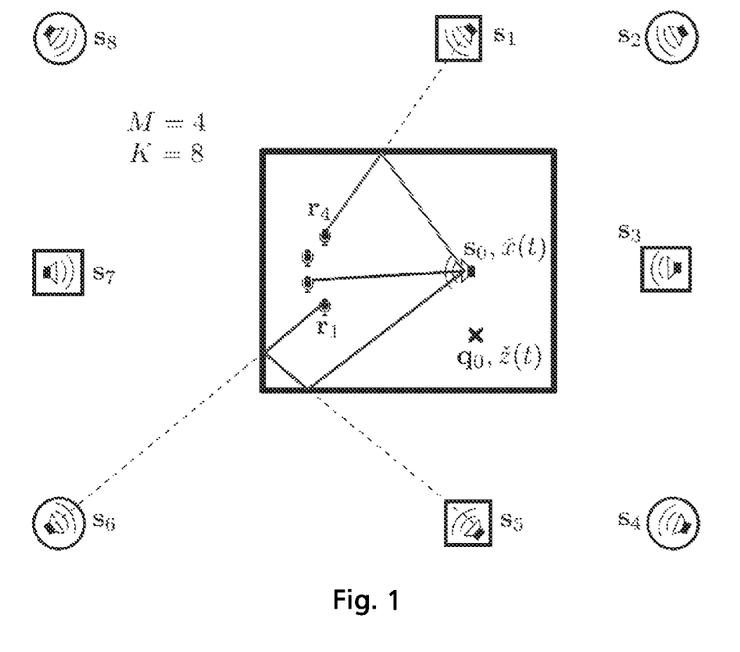
FIG. 1 shows an exemplary arrangement of a plurality of receivers in a room receiving an acoustic signal of an acoustic source and its image sources.

In the following the model for describing the beamforming technique according to the invention will be described with the help of FIG. 1. FIG. 1 shows a room with four reflective surfaces, i.e. the walls of the room. Suppose that in the room, there is a desired source of sound located at $s_0$. Sound from this source $s_0$ arrives at M receivers (microphones) located at $r_m$ in the room with m=1, ..., M via the direct path, but also through echoes from the walls. The echoes (multipath propagation) are modelled by the image source model as proposed in WO2014096364 which is hereby incorporated by reference for details of the image source model. The image sources are simply mirror images of the real sources across the corresponding walls. Denote the signal emitted by the source (e.g. the speech signal) x(t). Then all the image sources emit x(t) as well, and the signal from the image sources reaches the microphones with the appropriate delays (exactly the echo delays).

In our application, the echoes correspond to image sources. We denote the image source positions by $s_k$ with k=1, ..., K. It is not important if the image sources (image transmitters) are of first, second or higher generation, i.e. corresponding to a multipath component with one, two or more reflections. K denotes the largest number of the image sources considered. Suppose that in addition to the desired signal, there is an interferer at the location q (say only one for simplicity, but in general any number of them). The interferer emits the signal z(t), and so do its image sources. Same as for the desired source, $q_k$ with k=1, ..., K' denote the positions of interfering image sources. The following notations will be used in the following:
M Number of microphones
$r_m$ Location of the mth microphone
$s_0$ Location of the desired source
$s_i$ Location of the ith image of the desired source (i≥1)
$q_0$ Location of the interfering source
$q_i$ Location of the ith image of the interfering source (i≥1)
$x(e^{j\omega})$ Spectrum of the sound from the desired source
$z(e^{j\omega})$ Spectrum of the sound from the interfering source
$w(e^{j\omega})$ Vector of beamformer weights
K Number of considered desired image sources
K' Number of considered interfering image sources
$a_m(s)$ mth component of the steering vector for a source at s
$y_m$ Signal picked up by the mth microphone
$\|\cdot\|$ Euclidean norm, $\|x\|=(\Sigma|x_i|^2)^{-1/2}$.

The signal received by the m-th microphone is then a sum of convolutions $$\tilde{y}_m[n] = \sum_{k=0}^{K} (\tilde{a}_m(s_k) * \tilde{x})[n] + \sum_{k=0}^{K'} (\tilde{a}_m(q_k) * \tilde{z})[n] + \tilde{n}_m[n]. \quad (1)$$

The beamformers in the present invention can be designed in the time or in the frequency domain. The desired signal in the frequency domain is defined $$x(e^{j\omega}) \overset{def}{=} \sum_{n \in \mathbb{Z}} |\tilde{x}[n]| e^{-j\omega n}. \quad (2)$$

Then the signal picked up by the m-th microphone is given as $$y_m(e^{j\omega}) = \sum_{k=0}^{K} a_m(s_k, \Omega)x(e^{j\omega}) + \sum_{k=0}^{K'} a_m(q_k, \Omega)z(e^{j\omega}) + n_m(e^{j\omega}), \quad (3)$$

where $n_m(e^{j\omega})$ contains all unmodeled phenomena and noise. By $a_m(s_k; \Omega)$ we denote the m-th component of the steering vector corresponding to the source $s_k$. Continuous-time domain frequency is denoted by $\Omega$, while $\omega=\Omega T_s$ denotes the discrete-time domain frequency with the sampling interval $T_s$. The steering vector is then simply $a(s_k)=[a_1(s_k, \Omega), \ldots, a_M(s_k, \Omega)]^T$ with the M components of the steering vector corresponding to the M receivers. We can write out the entries of the steering vectors explicitly for a point source in the free field. They are given as the appropriately scaled Green's function for a Helmholtz equation at the frequency, $$a_m(s_k, \Omega) = \frac{\alpha_k}{4\pi \|r_m - s_k\|} e^{-j\kappa \|r_m - s_k\|}, \quad (4)$$

where we define the wavenumber $\kappa=\Omega/c$ with the sound velocity c. By $\alpha_k$ we denote the (possibly complex) attenuation corresponding to the series of reflections that lead to the image source $s_k$. The microphone signals can be written jointly in a vector form as $$y(e^{j\omega}) = \sum_{k=0}^{K} a(s_k, \Omega)x(e^{j\omega}) + \sum_{k=0}^{K'} a(q_k, \Omega)z(e^{j\omega}) + n(e^{j\omega}) \quad (5)$$
$$= A_s(e^{j\omega})1x(e^{j\omega}) + A_q(e^{j\omega})1z(e^{j\omega}) + n(e^{j\omega}),$$

The matrix $A_s(e^{j\omega})$ comprises K+1 columns and M rows, wherein the K+1 columns are the K+1 steering vectors $a(s_k)$ with k=0, ..., K. The matrix $A_q(e^{j\omega})$ comprises K'+1 columns and M rows, wherein the K'+1 columns are the K'+1 vectors $a(q_k)$ with k=0, ..., K'. The column vector 1 comprises M elements, wherein each element is one. Depending on the focus, we either make explicit, or omit the interference term.

The microphone beamformer combines the outputs of multiple microphones (acoustic receivers) in order to achieve spatial selectivity, or more generally, to suppress noise and interference and enhance the desired signal. We also call those microphone beamformers that are the object of this invention "acoustic rake receivers" (ARR) in analogy to wireless communications. At a given frequency, beamforming is achieved by taking a linear combination of the microphone outputs. From here onwards, we suppress the frequency dependency of the steering vectors and the beamforming weights to reduce the notational clutter. Wherever essential, we will make it explicit again. We compute the output of a beamformer as a linear combination of microphone outputs at a given frequency $$u = w^H y = w^H A_s 1x + w^H A_q 1x + w^H n, \quad (6)$$

where the column vector w comprises M complex valued beamforming weights. The $\cdot^H$ indicates the Hermitian transpose (adjoint) of the vector, and the equation (6) results in a complex value (for each frequency). The vector w is selected so that it optimizes some design criterion.

In the ARR, we aim to constructively use the echoes, instead of considering them to be detrimental. We achieve this e.g. through the image source model. In the following, different designs for the beamforming weights are presented.

A first embodiment could be called Delay-and-Sum Raking. If we had access to every individual echo of the desired signal x(t) separately, we could align them to achieve significant performance improvements. Unfortunately this is not the case: Each microphone picks up the convolution of speech with the impulse response, which is effectively a sum of echoes. If we only wanted to get the access to the direct path, we would use a standard Delay-and-Sum (DS) beamformer. Creating the DS beamformer for each image source and averaging the outputs yields $$\frac{1}{K+1}\sum_{k=0}^{K}\frac{\alpha'_k}{M}\sum_{m=0}^{M-1} y_m e^{j\omega\|r_m-s_k\|}, \quad (7)$$

This output sums the desired signals of the different echoes with correct phases such that they amplify each other, while the interference signal is not summed with adjusted phases such that the interference signal is weakened. From (7), we can read out the beamforming weights as $$w_{R\text{-}DS} = \frac{1}{\left\|\sum_k a(s_k)\right\|}\sum_{k=0}^{K} a(s_k) = \frac{A_s 1}{\|A_s 1\|}, \quad (8)$$

We see that this is just a sum of the steering vectors for each image source, with the appropriate scaling.

Another embodiment of the beamforming could be called One-Forcing Raking. If we want the beamformer to listen to all the K image sources equally, we may try solving the following problem $$\text{minimize } \mathbb{E}\left|\sum_{k=0}^{K'} w^H a(q_k) z + w^H n\right|^2 \quad (9)$$

subject to $w^H a(s_k) = 1, \forall\, 0 \le k \le K$.

Alternatively, we may choose to null the interfering source and its image sources. This is an instance of the standard linearly-constrained-minimum-variance (LCMV) beamformer. Collecting all the steering vectors in a matrix, we can write the constraint as $w^H A_s = 1^T$. The solution can be found in closed form as $$w_{OF} = K_{nq}^{-1} A_s (A_s^H K_{nq}^{-1} A_s)^{-1} 1_M. \quad (10)$$

The matrix $K_{nq}$ is the covariance matrix of the interfering signal and its echoes and the noise. A possible definition could be found below in equation (13). However, this approach has some disadvantages. First, with M microphones, K can be at most M −1, as otherwise we end up with more constraints than degrees of freedom. Second, using this beamformer is a bad idea, if there is an interferer along the ray through the microphone array and any of image sources. Potentially we could do a combinatorial search over all distributions of ones and nulls. As with all LCMV beamformers, adding linear constraints uses up degrees of freedom that could be used for noise and interference suppression. Therefore, this beamformer generally results in poor noise and interference suppression. As we demonstrate in the following, it is better to let the "beamformer decide" or "the beamforming procedure decide" on how to maximize a well-chosen cost function.

Another embodiment could be called Max-SINR Raking which overcomes the problems of the previous approach.

$$\text{maximize} \frac{\mathbb{E}\left|\sum_{k=0}^{K} w^H a(s_k) x\right|^2}{\mathbb{E}\left|\sum_{k=0}^{K'} w^H a(q_k) z + w^H n\right|^2}. \quad (11)$$

The logic behind this expression is as follows: We present the beamforming procedure with a set of good sources, whose influence we aim to maximize at the output, and with a set of bad sources, whose power we try to minimize at the output. Interestingly, this leads to the standard Max-SINR beamformer with a structured steering vector and covariance matrix. Define $$A_s \overset{def}{=} [a(s_0), \ldots, a(s_K)] \quad (12)$$

and $$K_{nq} \overset{def}{=} K_n + \sigma_z^2 \left(\sum_{k=0}^{K'} a(q_k)\right)\left(\sum_{k=0}^{K'} a(q_k)\right)^H, \quad (13)$$

The matrix $K_{nq}$ is the covariance matrix of the noise and the interference as measured by the microphones. The matrix $K_{nq}$ depends first on the covariance matrix $K_n$ of the noise. If there is no interferer, the second term is zero. If there is an interferer signal, the second term is based on the sum of the steering vectors of the position $q_0$ of the interfering source and the interferer's image sources multiplied with the same, but adjoint sum vector. The positions $q_0$ of the interferer source and of the interferer image sources $q_k$ k=1, ..., K' can be determined as described above by echo sorting or another method. $\sigma^2$ is the power of the interferer signal z(t) at a particular frequency. Then the solution to (11) is given as $$w_{R\text{-}SINR} = \frac{K_{nq}^{-1} A_s 1}{1^H A_s^H K_{nq}^{-1} A_s 1}. \quad (14)$$

Therefore, in this case the beamforming weights do not only depend on the relative position or distance of the image sources of the desired sound source with respect to the plurality of receivers, but also on the relative position or distance of the image sources of the interferer sound source (in the following: image interferer sources) with respect to the plurality of receivers. Of all the described raking beamformers, this beamformer appears to work best.

In one embodiment, the following fact is used: adding early reflections (up to 50 ms in the RIR) is as good as adding the energy to the direct sound as far as the speech intelligibility goes. Such a measure could be called useful-to-detrimental sound ratio (UDR). This motivates the following definition. Consider early reflections coming from K image sources in addition to the early sound. Early sound refer to signal paths arriving at the receiver before the direct sound. The useful signal is then a coherent sum of direct and early reflected speech energy, so that where the numerator coherently sums up the contributions of the energies of early reflections. Equation (11) becomes is therefore adapted to $$\text{maximize} \frac{\mathbb{E} \sum_{k=0}^{K} |w^H a(s_k) x|^2}{\mathbb{E} \left| w^H \sum_{k=0}^{K'} a(q_k) z + w^H n \right|^2}. \quad (15)$$

We see that this amounts to maximizing the following generalized Rayleigh quotient, $$\frac{w^H A_s A_s^H w}{w^H K_{nq} w}. \quad (16)$$

Assuming that $K_{nq}$ has a Cholesky decomposition as $K_{nq} = C^H C$, we can write this quotient as $$\frac{\tilde{w}^H (C^{-1})^H A_s A_s^H C^{-1} \tilde{w}}{\tilde{w}^H \tilde{w}}, \text{ where } \tilde{w} \overset{def}{=} Cw. \quad (17)$$

The maximum of this expression is $$\lambda_{max}((C^{-1})^H A_s A_s^H C^{-1}), \quad (18)$$

where $\lambda_{max}(\ )$ denotes the largest eigenvalue of the argument matrix. The maximum is achieved by the corresponding eigenvector $$\tilde{w}_{max}.$$

Then the optimal weights are given as $$w_{R\text{-}UDR} = C^{-1} \tilde{w}_{max}. \quad (19)$$

It can be shown that beamforming towards image sources indeed improves the SINR.

In the shown embodiments, the beamforming weights depend on the distance of the image sources to the plurality of receivers. However, we could also design a microphone beamformer depending only on the direction of the image sources with respect to the microphone array.

Figure 2:
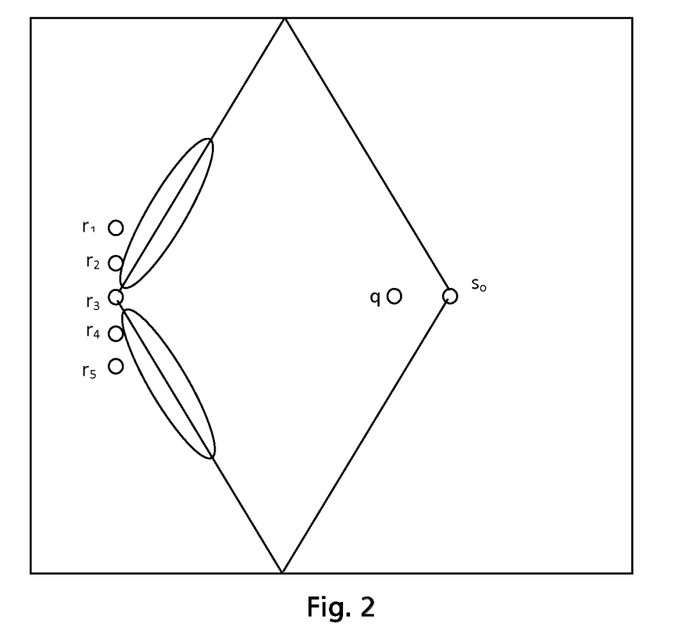
FIG. 2 shows an exemplary beamforming by a plurality of receivers.

The shown embodiments for the microphone beamformers are exemplary. Any other beamforming weights can be used, which use the information about the direction, distance or position of the image sources. FIG. 2 shows now an exemplary array of acoustic receivers at the positions $r_i$ with $i=1, \ldots, 5$ and at least one acoustic source $s_0$. In the line of sight of the array of receivers and the acoustic source (acoustic transmitter) an interferer is placed at the position q. When the receiving beampattern of the array of receivers is determined on the basis of the direction and/or distance and/or position of the image sources (echoes), the quality of the received signal x(t) at the array of receivers can be increased.

Figure 3:
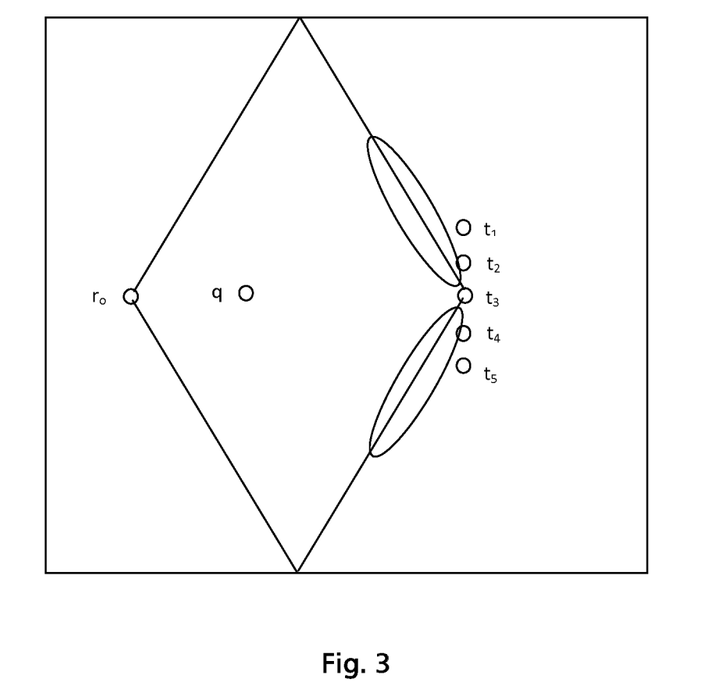
FIG. 3 shows an exemplary beamforming by a plurality of transmitters.

The same principle can be used to beamform the transmitted signal by a plurality of transmitters at the transmission side. The plurality of transmitters are arranged at the positions $t_i$ with $i=1, \ldots, 5$ and at least one acoustic receiver is arranged at $r_0$ as shown in FIG. 3. The spatial distribution properties of the transmitted signal of the array of transmitters are determined on the basis of the image receivers of the real receiver at $r_0$. All the design options for the microphone beamformer can be used for a loudspeaker beamformer in order to optimize the quality of the received signal at the at least one receiver. In the above mentioned formulas for determining the weight vector w the steering vectors $a(s_k)$ with $k=0, \ldots, K$ of the position of the sound source(s) $s_0$ and their image sources $s_k$ with $k=1, \ldots, K$ must be replaced by the steering vectors $a(r_k)$ with $k=0, \ldots, K$ of the position of the acoustic receiver(s) $r_0$ and their image sources $r_k$ with $k=1, \ldots, K$. If there is an acoustic receiver at the position q which should not receive the present sound signal, it could be treated like the interferer at the position q in the above-mentioned formulas for the beamforming weight vector w. The positions $r_k$ with $k=1, \ldots, M$ of the plurality of receivers in the above-mentioned formulas must be replaced by the positions $t_k$ with $k=1, \ldots, M$ of the plurality of transmitters. For the sake of brevity, the above given explanations are not repeated and can be applied analogously.

Figure 4:
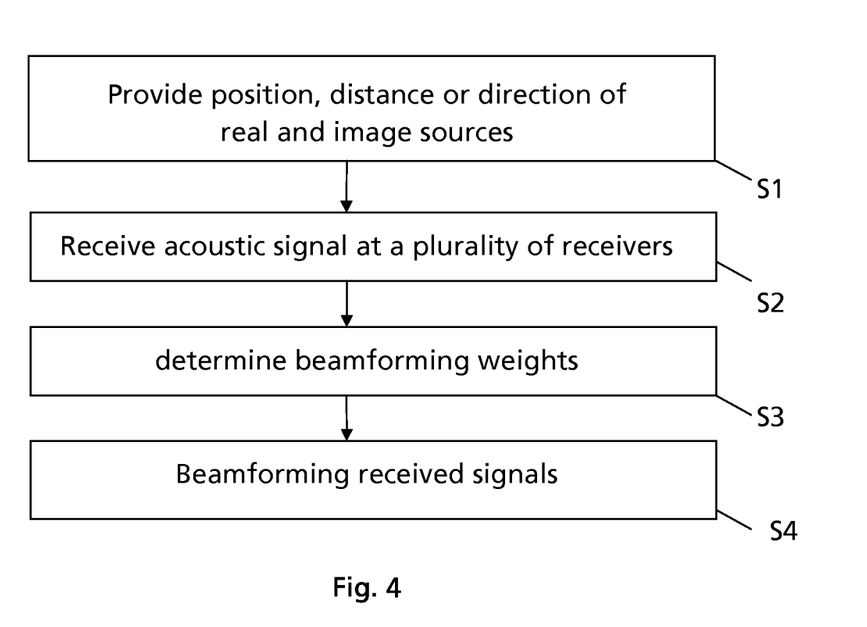
FIG. 4 shows an embodiment for a method for determining the beamforming weights for a plurality of acoustic receivers.

FIG. 4 shows now an acoustic processing method. In a first step S1, the relative position, the distance and/or the direction of the image sources of at least one real sound source with respect to a plurality of acoustic receivers (e.g. microphones) is provided. Each Image source corresponds to at least one path between one real sound source and at least one of the plurality of receivers reflected at least once on a reflective surface. The image source corresponding to at least one path is a theoretical position of a sound source, which would emit the line-of-sight signal received at at least one of the plurality of receivers from this at least one path. Normally, for planar reflective surfaces, one image source corresponding to one reflective surface corresponds to a plurality of paths from one source reflected at this reflective surface to a corresponding plurality of receivers (not necessarily all of the receivers).

In one embodiment, the relative position, the distance and/or the direction of the image sources is simply received at the processing method. In another embodiment, the relative position, the distance and/or the direction is determined. In the following a number of potential embodiments for determining the relative position, the distance and/or the direction will be explained. However, the invention shall not be restricted to one of those embodiments.

Figure 5:
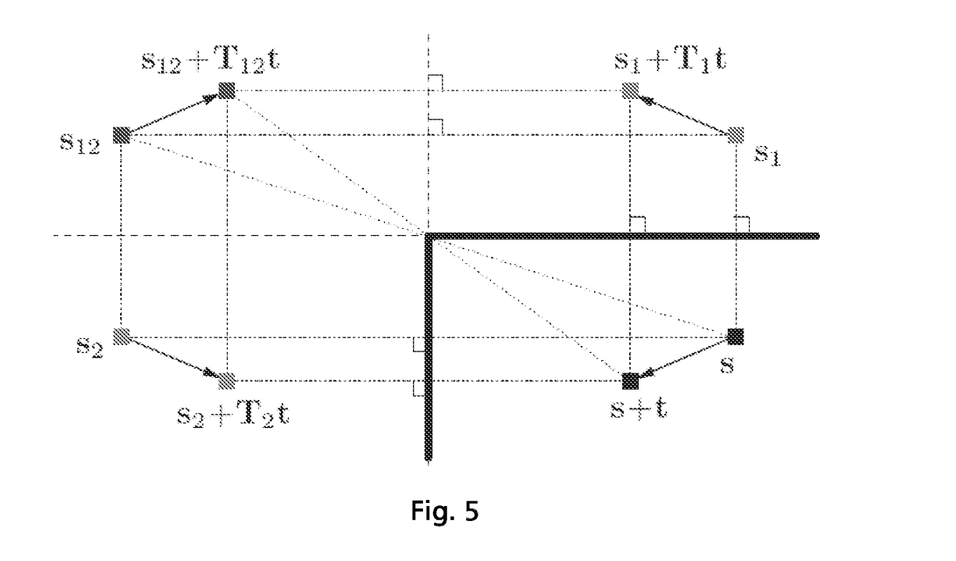
FIG. 5 shows an embodiment for determining the position of the image sources given the source and the reflective surfaces.

In many cases, and for many fixed deployments, the room geometry will be known. This knowledge could be obtained at the time of the deployment, or simply through a database of floorplans. In most indoor office and similar geometries, we will encounter a large number of planar reflectors. These reflectors will correspond to image sources. In FIG. 5, it is shown how the image sources of planar reflectors can be determined. Suppose that the real source is located at s. Then the image source with respect to wall i is computed as, $$im_i(s) = s + 2 \langle p_i - s, n_i \rangle n_i. \quad (20)$$

where i indexes the wall, $n_i$ is the outward normal associated with the i-th wall, and $p_i$ is any point belonging to the i-th wall. In other words, the image source of first order is determined by mirroring the real source on the wall i. Analogously, we compute image sources corresponding to higher order reflections, $$im_j(im_i(s))=im_i(s)+2\langle p_j-im_i(s),n_j\rangle n_j. \quad (21)$$

The above expressions are valid regardless of the dimensionality (concretely, in 2D and 3D). From the positions of the K image sources and the positions of the M receivers, the desired relative positions, the distances and/or the directions could be calculated in order to compute the beamforming weights.

When the room geometry is not known, it is alternatively possible to use the same array we use for beamforming to estimate the room geometry. Therefore, a calibration signal is sent from a known relative position in order to determine at at least one of the plurality of receivers, preferably more than one, in order to determine the room geometry. In one embodiment, a dictionary of wall impulse responses recorded with a particular array is used. In another embodiment, Hough transform is used to find the image positions on the basis of a received signal. In another embodiment, an echo sorting mechanism is used to find the image sources, from which the room geometry is then derived.

In another embodiment, the image sources are determined directly on the basis of the received signals. In many scenarios the room geometry will be difficult to estimate. This is where echo sorting could be particularly useful. The main observation here is that we do not really need to know how the room looks like, at least not exactly. We only need to know where the major echoes are coming from in order to apply our ARR principle.

If the relative positions, distances and/or directions of an interferer and/or its image sources is used for the beamforming weights, the same procedures can be used for determining those.

In step S2, the acoustic signal sent by at least one source is received (evtl. superimposed by noise and/or an interferer) at the plurality of receivers. In step S3, the beamforming weights are determined on the basis of the relative position, distance or direction of the image transmitters with respect to the plurality of receivers. In some embodiments, the relative position, i.e. distance and direction, is used. However, it is also possible, to use only the distance e.g. for phase-adaptive sum of the received signals or to use only the direction, e.g. to focus the beampattern of the receiver on the directions of the echoes. Examples of beamforming weights for microphone beamformers were given above. The order of the steps S1 to S3 are in most cases interchangeable. The beamforming weights could be determined before or after having received the signal. In step S4, the M received signals are summed up weighted by the beamforming weights determined in step S3. If the beamforming weights depend on the frequency, the linear combination of the M signals weighted by the M beamforming weights must be performed for each frequency individually. If the beamforming is performed in the time domain, then the convolutions of the microphone signals with the beamforming filters must be computed.

Figure 6:
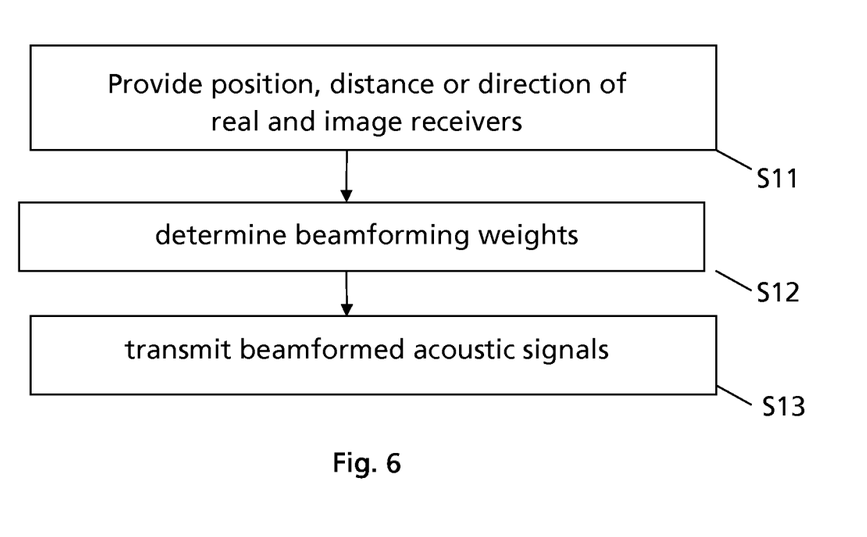
FIG. 6 shows an embodiment for a method for determining the beamforming weights for a plurality of acoustic transmitters.

FIG. 6 shows now another embodiment of an acoustic processing method for an acoustic rake transmitter as shown in FIG. 3. In step S11, the relative position, the direction and/or the distance of the image receivers of the at least one receiver with respect to the plurality of transmitters is provided. As in step S1, those can be received or determined by the same methods as described above. In step S12, the beamforming weights are determined on the basis of the relative position, distance or direction of the image receivers with respect to the plurality of transmitters. In some embodiments, the relative position, i.e. distance and direction, is used. However, it is also possible, to use only the distance e.g. for phase-adaptive sum of the received signals or to use only the direction, e.g. to focus the beampattern of the transmitting beamformer in the directions of some selected echoes that reach one or more receivers. The examples of beamforming weights for microphone beamformers given above can be applied in the same way, wherein the position of the image sources must be replaced by the positions of the plurality of real sources (transmitters) and the positions of the plurality of receivers must be replaced by the plurality of image receivers. In step S13, the M transmitted signals are each weighted by the corresponding beamforming weight determined in step S12. If the beamforming weights depend on the frequency, the weights for each of the M transmitted signals must applied in dependency of the frequency of the transmitted signal.

Figure 7:
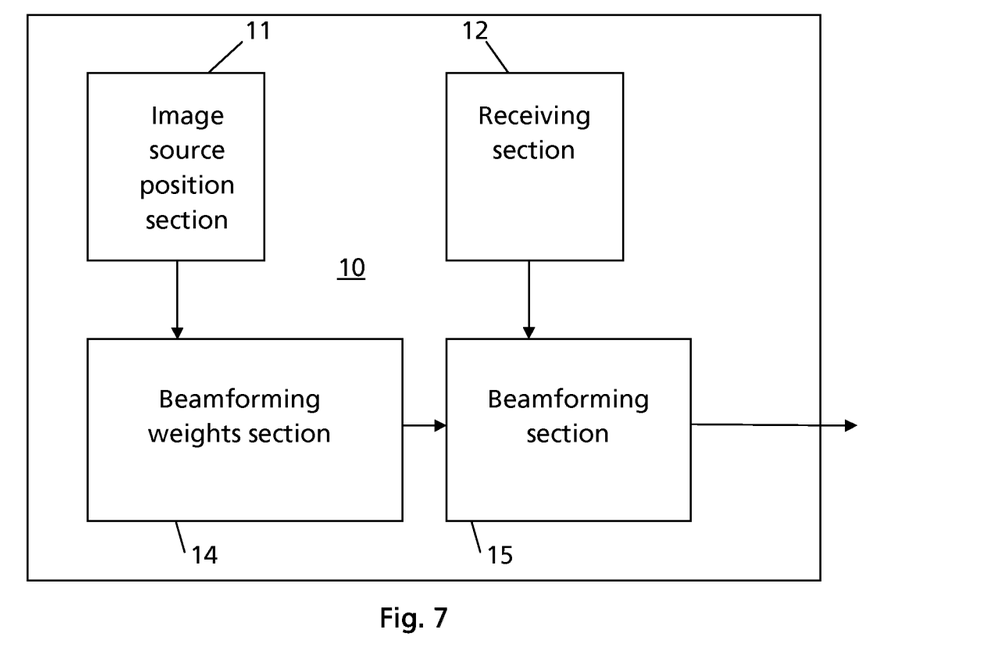
FIG. 7 shows an embodiment for an apparatus for determining the beamforming weights for a plurality of acoustic receivers.

FIG. 7 shows an embodiment of an apparatus 10 for performing beamforming for a plurality of receivers. The apparatus 10 comprises an image source position section 11, a receiving section 12, a beamforming weights section 13 and a beamforming section 14. The image source position section 11 is configured to receive or determine the position of the source and image sources of the desired signal(s) x(t) and optionally of the interfering signal or interfering signals. Preferably, the position of image sources of signals x(t) or z(t) is determined by first determining the locations of the real sources using one of the many available algorithms for source localization in reverberant environments. This can be based for example on the time differences between the signals received at the receivers and the information about the receiver array and room geometry. The receiving section 12 is configured to receive the signal received at the M receivers. The beamforming weight section 13 is configured to determine the beamforming weights as described above. The beamforming section 15 is configured to perform beamforming of the M received signals and on the determined beamforming weights.

Figure 8:
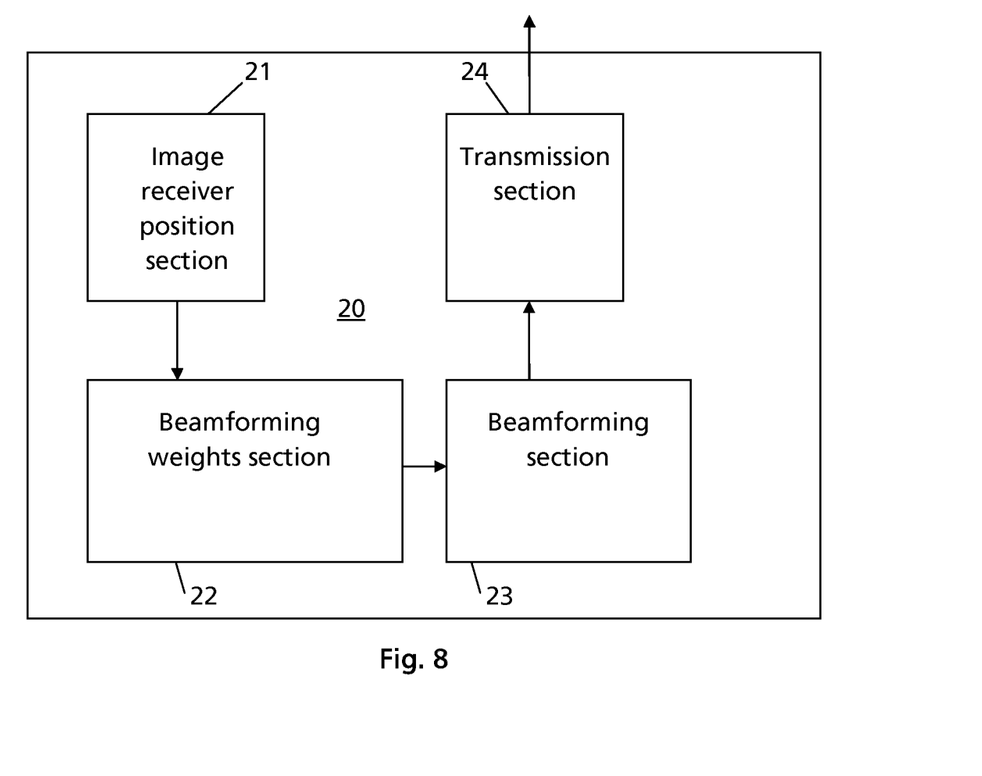
FIG. 8 shows an embodiment for an apparatus for determining the beamforming weights for a plurality of acoustic transmitters.

FIG. 8 shows an embodiment of an apparatus 20 for performing beamforming for a plurality of transmitters. The apparatus 20 comprises an image receiver position section 21, a transmission section 24, a beamforming weights section 22 and a beamforming section 23. The image receiver position section 21 is configured to receive or determine the position of the receiver and image receivers of at least one receiver. The beamforming weight section 22 is configured to determine the beamforming weights as described above. The beamforming section 23 is configured to determine M signals for transmission on the basis of the desired signal x(t) and the beamforming weights. The transmission section 24 is configured to transmit the M signals determined in the beamforming section 23.

In all described embodiments, the plurality of image transmitters can additionally comprise the at least one real transmitter. In all described embodiments, the plurality of image receivers can additionally comprise the at least one real receiver.

The embodiments of the rake receiver can be combined with the embodiments of the rake transmitter.

The distance and/or direction of an image transmitter corresponds exactly to the length of the multipath component corresponding to the image transmitter and to the direction of this multipath after the last reflection before being received at one of the plurality of receivers. Therefore, the distance and/or direction of an image transmitter covers also the equivalent length of the multipath component of this image transmitter and the direction of this multipath component from its last reflection to the corresponding receiver.

The distance and/or direction of an image receiver corresponds exactly to the length of the multipath corresponding to the image receiver and to the direction of this multipath component between the corresponding transmitter and the first reflection. Therefore, the distance and/or direction of an image receiver covers also the equivalent length of the multipath component of this image receiver and the direction of this multipath component from its transmitter to the first reflection.

In the described embodiments, the beamforming was performed and/or the beamforming weights were determined in the frequency domain. However, it is also possible to perform the beamforming and/or to determine the beamforming weights in the time domain.

The invention was described for sound processing in rooms, but shall not be restricted to such embodiments. The invention can be applied also outside of rooms in any locations with at least one obstacle creating reflections or image sources, respectively, of an acoustic real source. Preferably, each obstacle has a plane surface with one normal vector. Such a situation could be for example in a court yard, a street, etc. Those acoustic situations could also be called reverberant environments.

The invention is not restricted to the shown embodiments, but shall cover all embodiments falling under the scope of the patent claims.

The invention claimed is:

1. An acoustic processing method for M acoustic receivers comprising the steps of:
   determining a position of a real acoustic source and K positions of K image sources of the real acoustic source, wherein K is the number of image sources considered, wherein each of the image sources of the real acoustic source corresponds to one path of the acoustic signal between the real acoustic source and one of the M acoustic receivers with at least one reflection;
   determining a beamforming weight vector with M weights for the M acoustic receivers based on a steering vector of the position of the real acoustic source, on steering vectors of the positions of the image sources of the real acoustic source and on a first matrix, wherein the first matrix depends on a covariance matrix of the noise and/or on a position of an interfering acoustic source; and
   linearly combining the M acoustic signals received at the M acoustic receivers on the basis of the M weights of the beamforming vector.

2. Method according to claim 1, comprising determining the position of the interfering acoustic source, wherein said first matrix is calculated on the basis of the determined position of the interfering acoustic source.

3. Method according to claim 2, comprising determining positions of interfering image sources, wherein said first matrix is calculated on the basis of the position of the interfering source and on the positions of the interfering image sources, wherein each of the interfering image sources corresponds to one path of the interfering signal between the interfering acoustic source and one of the M acoustic receivers with at least one reflection.

4. Method according to claim 3, wherein said first matrix is calculated based on the sum of the steering vectors of the positions of the interfering acoustic source and the image interfering sources.

5. Method according to claim 4, wherein said first matrix is calculated based on the sum of the steering vectors of position of the interfering acoustic source and the positions of the image interfering sources multiplied with the adjoint of the sum of the steering vectors of the positions of the interfering acoustic source and the positions of the image interfering sources.

6. Method according to claim 1, wherein said first matrix comprises a first addend depending on the covariance matrix of the noise and a second addend depending on the position of an interfering acoustic source.

7. Method according to claim 1, wherein the beamforming weight vector is based on the first matrix and on a second matrix depending on the steering vector of the position of the real acoustic source and on the steering vectors of the positions of the image sources of the real acoustic source.

8. Method according to claim 7, wherein the second matrix comprises the steering vector of the position of the real acoustic source and the steering vectors of the positions of the image sources of the real acoustic source as columns or rows.

9. Method according to claim 7, wherein the beamforming weight vector is proportional to diagonal elements of the multiplication of the inverse of said first matrix with the second matrix.

10. Method according to claim 7, wherein the beamforming weight vector is proportional to the eigenvector of a third matrix corresponding to the largest eigenvalue, wherein the third matrix depends on the first matrix and the second matrix.

11. Method according to claim 10, wherein the third matrix depends on the inverse of the Cholesky decomposition of the first matrix and on the second matrix.

12. Method according to claim 11, wherein the third matrix is proportional to $$(C^{-1})^H A_s A_s^H C^{-1},$$

with C being the Cholesky decomposition of the first matrix and $A_s$ being the second matrix.

13. Method according to claim 1, wherein the beamforming weight vector is proportional to the inverse of said first matrix multiplied with the sum of the steering vectors of the positions of the image sources of the real acoustic source.

14. An acoustic processing method for M acoustic transmitters comprising the steps of:
   determining a position of a real acoustic receiver and positions of image receivers, wherein each of the image receivers corresponds to one path of a transmission signal between one of the M transmitters and the real acoustic receiver with at least one reflection;
   determining a beamforming weight vector with M weights for the M acoustic transmitters based on a steering vector of the position of the real acoustic receiver, on steering vectors of the positions of the image receivers of the real acoustic receiver and on a first matrix calculated on the basis of the covariance matrix of the noise and/or on the basis of a position of another acoustic receiver which is not intended to receive a transmission signal, and
   beamforming the transmission signal with the M weights for the M acoustic transmitters.

15. An acoustic processing apparatus for M acoustic receivers comprising:
   a position section for determining a position of a real acoustic source and K positions of K image sources of the real acoustic source, wherein K is the number of image sources considered, wherein each of the image sources of the real acoustic source corresponds to one path of the acoustic signal between the real acoustic source and one of the M acoustic receivers with at least one reflection;

a beamforming weights section for determining a beamforming weight vector with M weights for the M acoustic receivers based on a steering vector of the position of the real acoustic source, on steering vectors of the positions of the image sources of the real acoustic source and on a first matrix, wherein the first matrix depends on a covariance matrix of the noise and/or on a position of an interfering acoustic source; and a beamforming section for linearly combining the M acoustic signals received at the M acoustic receivers on the basis of the M weights of the beamforming vector.

16. An acoustic processing apparatus for M acoustic transmitters comprising:

a position section for determining a position of a real acoustic receiver and positions of image receivers, wherein each of the image receivers corresponds to one path of a transmission signal between one of the M transmitters and the real acoustic receiver with at least one reflection;

a beamforming weights section for determining a beamforming weight vector with M weights for the M acoustic transmitters based on a steering vector of the position of the real acoustic receiver, on steering vectors of the positions of the image receivers of the real acoustic receiver and on a first matrix calculated on the basis of the covariance matrix of the noise and/or on the basis of a position of another acoustic receiver which is not intended to receive a transmission signal, and a beamforming section for beamforming the transmission signal with the M weights for the M acoustic transmitters.

* * * * *